United States Patent [19]

Maltsev et al.

[11] Patent Number: 4,509,134
[45] Date of Patent: Apr. 2, 1985

[54] SQUARING DEVICE WITH COOLING MEANS

[76] Inventors: Jury S. Maltsev, ulitsa Kalinina, 8, kv. 52; Viktor D. Shevchenko, gorodok 17, dom 366, kv. 9; Mikhail M. Chernin, ulitsa Lenina, 41, kv. 9, all of Omsk, U.S.S.R.

[21] Appl. No.: 395,041
[22] PCT Filed: Nov. 28, 1980
[86] PCT No.: PCT/SU80/00192
§ 371 Date: Jun. 18, 1982
§ 102(e) Date: Jun. 18, 1982
[87] PCT Pub. No.: WO82/01949
PCT Pub. Date: Jun. 10, 1982

[51] Int. Cl.³ .............................................. B06G 7/20
[52] U.S. Cl. ................................................. 364/813
[58] Field of Search ................ 364/800, 807–808, 364/813–814

[56] References Cited

U.S. PATENT DOCUMENTS

| 2,674,409 | 4/1954 | Lakatos | 364/813 |
| 2,951,976 | 9/1960 | Sasseen | 321/1.5 |
| 3,064,898 | 11/1962 | Walker | 364/814 |
| 3,088,670 | 5/1963 | Perls | 235/193 |
| 3,423,578 | 1/1969 | Platzer, Jr. et al. | 364/813 |
| 3,443,081 | 5/1969 | Nathan | 364/813 |
| 3,486,014 | 12/1969 | Richman | 235/151.31 |
| 3,543,288 | 11/1970 | Collings | 364/813 |
| 3,864,558 | 2/1975 | Yu | 364/813 |

FOREIGN PATENT DOCUMENTS

| 883662 | 12/1961 | United Kingdom | 364/813 |
| 434420 | 6/1974 | U.S.S.R. | |
| 460548 | 3/1975 | U.S.S.R. | 364/813 |
| 475514 | 6/1975 | U.S.S.R. | |
| 675427 | 7/1979 | U.S.S.R. | |
| 813464 | 3/1981 | U.S.S.R. | 364/813 |

OTHER PUBLICATIONS

"Alternating-Current to Direct-Current Voltage Measuring Transducers" by L. I. Volgin, Measuring AC/DC Converters, Sovetskoye Radio, Moscow, 1977, pp. 105–106, FIG. 3.2.
"Electro-Thermal Converters in Computing Engineering", V. S. Popov, Tekhnika, Kiev, 1971, pp. 40–41, FIG. 1,3.
Cf. A Book by V. S. Popov, Heated Metal Resistors for Electric Measuring and Automatic Control Systems, Nauka, Moscow, 1964, pp. 67–68, FIG. 1.14.

*Primary Examiner*—Jerry Smith
*Assistant Examiner*—Gary V. Harkcom
*Attorney, Agent, or Firm*—Lilling & Greenspan

[57] ABSTRACT

A squarer includes an electrical heater maintained in thermal contact with a first working surface of a main cooling means, the first working surface also being maintained in thermal contact with a first sensitive element of a first differential temperature sensor. A second sensitive element of the sensor is maintained in thermal contact with a second working surface of the main cooling means, which is in thermal contact with a first working surface of an additional cooling means. A second working surface of the additional cooling means is in thermal contact with a heatsink. The squarer also comprises an additional differential temperature sensor, which has its first sensitive element maintained in thermal contact with the second working surface of the additional cooling means and has its second sensitive element maintained in thermal contact with a respective working surface of the main cooling means.

4 Claims, 3 Drawing Figures

SQUARING DEVICE WITH COOLING MEANS

FIELD OF THE INVENTION

The invention relates to computer engineering and more particularly to analog computing devices, including a squarer intended for squaring electric signals of arbitrary shape.

DESCRIPTION OF THE PRIOR ART

Modern practice in computer engineering deals with the development of a squarer capable of squaring r.f. signals, which tend to vary in a wide dynamic range.

Known in the art is a squarer, which relies on the use of non-linear volt/ampere characteristics of some semiconductor devices such as diodes and transistors. Such a squarer is easy to carry out, but it features poor accuracy and a small input signal dynamic range within which the conversion retains its square-law function (cf. the USSR Inventor's Certificate No. 366,476, Int.cl. G06G (7/20, published in bulletin "Discoveries, Inventions, Industrial Designs and Trademarks", No. 7, 1973).

There is a squarer or line-segment approximator which uses diode-resistor components in order to expand the input signal dynamic range. It is able to perform squaring with an accuracy of 1 to 2%, which depends on the instability of the employed semiconductor devices (cf. a book by L. I. Volgin entitled "Measuring AC/DC Converters", Sovetskoye Radio, Moscow, 1977, pp. 105–106, FIG. 3.2).

There is yet another squarer, which operates on the principle that the input signal is transformed into a change in the temperature of a resistive element and a thermocouple is used to measure the temperature of said resistive element. This squarer basically comprises a heater (resistive element) and a temperature sensor (thermocouple), which is held in thermal contact with the heater. The input signal passes through the heater and its temperature is thus raised. The thermocouple output signal is representative of the square of the input signal (cf. a book by V. S. Popov entitled "Elelectrothermal Converters in Computing Engineering", Tekhnika, Kiev, 1971, pp. 40–41, FIG. 1,3).

The squarer just described fails to provide for squaring in a wide dynamic range of the input signal, since an increase in the input signal causes an increase in the temperature of the resistive element, following a square law, with the result that this element burns out. This determines the upper limit of the input signal variation. On the other hand, a decrease in the input signal causes a decrease in the temperature of the resistive element in accordance with a square law, and the low-level input signals cannot thus be squared.

To enable the squarer to operate adequately, it must be raised to a temperature exceeding the ambient temperature. This, however, impairs the accuracy of squaring on account of the Peltier and Thomson effects. Moreover, the fact that the material of the resistive element includes irregularities and the availability of the contacts of dissimilar materials in the input signal circuit result in an uneven heating of that element during the passage of the input signal through it and in the appearance of stray thermal electromotive forces. Under such circumstances, the squaring results are poor.

In this squarer, the output signal settling time depends on the conditions in which the resistive element and the thermocouple exchange heat with the environment. This means that the squaring time also depends on the above conditions.

To improve the squarer sensitivity and decrease inaccuracies relating to a higher working temperature of the resistive element, use may be made of a thermopile for measuring the temperature. With the sensitivity of the temperature sensor improved, a decrease in the working temperature of the resistive element with respect to the ambient temperature may be obtained (cf. the USSR Inventor's Certificate No. 475,514. Int. cl. G01K 7/02, published in bulletin "Discoveries, Inventions, Industrial Designs and Trademarks", No. 24, 1975).

However, a thermopile is disadvantageous in that there results an increase in the stray capacitance established between it and the resistive element. This in turn tends to introduce a higher squaring error for the input signals in the r.f. band.

To stabilize to some extent the heat exchange conditions for the resistive element and environment, a squarer is used in which the resistive element and temperature sensor are housed in a hermetically sealed metal casing featuring a high thermal conductivity (cf. a book by V. S. Popov entitled "Heated Metal Resistors for Electric Measuring and Automatic Control Systems", Nauka, Moscow, 1964, pp. 67–68, FIG. 1.14).

In this embodiment, the leads of the resistive element have an increased stray capacitance with respect to the casing, with the result that considerable errors occur at radio frequencies.

There is a prototype of the instant invention, which is implemented as a squarer comprising an electrical heater whose leads serve as the squarer input. Maintained in thermal contact with the heater is one of the working surfaces of a cooling means whose leads serve as the squarer output. The described squarer also comprises a temperature sensor which has its sensitive element held in thermal contact with the above surface of the cooling means (cf. the USSR Inventor's Certificate No. 675,427, Int.cl. G06G 7/20, published in bulletin "Discoveries, Inventions, Industrial Designs and Trademarks, No. 27, 1979).

This squarer can serve a relatively wide frequency band of the input signals, but features an insufficient sensitivity and its squaring capacity is poor in the case of low-level input signals. This is explained by the fact that the cooling means, made of semiconductor materials, must have a high cooling power and, as a consequence, large dimensions. This results in a condition in which the heater gives up a considerable amount of heat absorbed by the environment on account of the thermal conductivity of the constructional elements of the cooling means. To resist the removal of the heat from the heater by the cooling means, the latter would have smaller dimensions, which would lead to a decrease in its cooling power and the squaring of high-level input signals would thus be impaired.

It is seen therefore that the known constructional features, when embodied in the described squarer, fail to provide for an extension of the input signal dynamic range.

SUMMARY OF THE INVENTION

The present invention seeks to attain a squarer capable of squaring electric signals by using their thermal effect, and it offers higher sensitivity and extended input signal dynamic range due to a more effective conversion of thermal flux into information-conveying signal.

This is attained in a squarer comprising an electrical heater whose leads serve as the squarer input. The heater is maintained in thermal contact with a first working surface of a main cooling means whose leads serve as the squarer output, and a main temperature sensor having its first sensitive element maintained in thermal contact with said first working surface of the main cooling means. In accordance with the invention, said main temperature sensor is implemented as a differential sensor having its second sensitive element maintained in thermal contact with a second working surface of the main cooling means. The squarer also comprises an additional cooling means whose leads serve as an additional output of the squarer, a first working surface of said additional cooling means being maintained in thermal contact with said second working surface of the main cooling means. A heatsink is maintained in thermal contact with a second working surface of said additional cooling means. An additional differential temperature sensor has its first sensitive element maintained in thermal contact with said second working surface of said additional cooling means, and has its second sensitive element maintained in thermal contact with the first working surface of the main cooling means.

In order to provide for automation of the squaring operation, the squarer of the instant invention may include a first d.c. amplifier connected by its input to the leads of the main temperature sensor and a second d.c. amplifier having its input connected to the leads of the additional temperature sensor and having its output connected to the leads of the main cooling means, the output of the first d.c. amplifier being connected to the leads of the additional cooling means.

In order to provide for automation of the squaring operation and make it more accurate, the squarer of the instant invention may include a first converter adapted to convert voltage to pulse length and connected by its input to the leads of the main temperature sensor and a second converter adapted to convert voltage to pulse length and having its input connected to the leads of the additional temperature sensor and having its output connected to the leads of the main cooling means, the output of the first voltage-to-pulse length converter being coupled to the leads of the additional cooling means.

The squarer disclosed makes it possible to construct computing devices offering higher sensitivity in a wide dynamic range of input electrical signals.

BRIEF DESCRIPTION OF THE DRAWINGS

The invention will now be described in more detail with reference to the accompanying drawings in which.

DETAILED DESCRIPTION OF THE INVENTION

Figure 1:
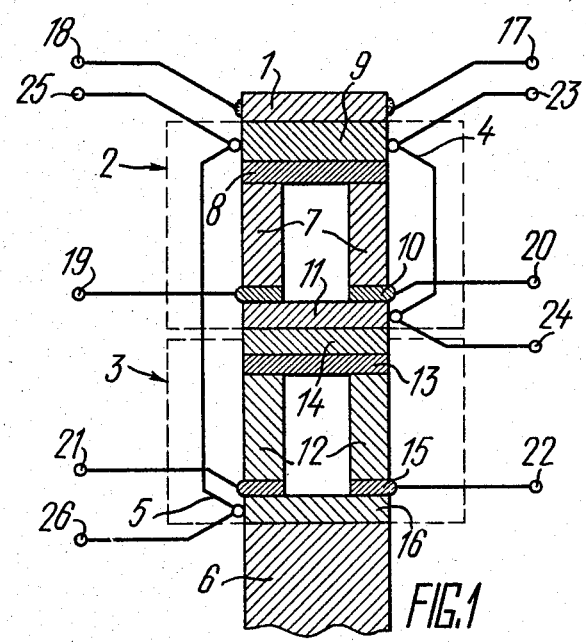
FIG. 1 is a lateral section of a squarer, according to the invention.

Referring to FIG. 1, a squarer of the instant invention, intended for squaring d.c. or a.c. electrical signals, comprises an electric heater 1, cooling means 2 and 3, differential temperature sensors 4 and 5, and a heatsink 6.

The cooling means 2 comprises two semiconductor elements 7 offering p- and n-type conduction, respectively, one side of each of said elements 7 being coupled by soldering with a covering metal layer 8 deposited on a heat-conducting substrate 9. The other side of each of said elements 7 is connected by soldering with metal electrodes 10 deposited on a heat-conducting substrate 11. The electrodes 10 are electrically isolated from each other and serve as a means for connecting the cooling means 2 to a power supply circuit. The heat-conducting substrate 9 performs the function of a first working surface of the cooling means 2. The heat-conducting substrate 11 serves as a second working surface of the cooling means 2.

The cooling means 3 has identical design features with the cooling means 2 and comprises two semiconductor elements 12, one side of each of said elements 12 being connected by soldering with a covering metal layer 13 deposited on a heat-conducting substrate 14. The other side of each of the elements 12 is coupled by soldering with metal electrodes 15 deposited on a heat-conducting substrate 16. The electrodes 15 each have electric insulation and serve as a means for connecting the cooling means 3 to a power supply circuit. The heat-conducting substrate 14 performs the function of a first working surface of the cooling means 3, while the heat-conducting substrate 16 serves as a second working surface of the cooling means 3.

The heater 1 is installed on the heat-conducting substrate 9. The heat-conducting substrates 11 and 14 of the cooling means 2 and 3, respectively, are affixed to each other by means of a heat-conducting cement. The heat-conducting substrate 16 is cemented to the heatsink 6.

The differential temperature sensor 4 is mounted in such a manner that its first sensitive element is held in thermal contact with the first working surface of the cooling means 2, i.e. with the heat-conducting substrate 9. The second sensitive element of the sensor 4 is held in thermal contact with the second working surface of the cooling means 2, i.e. with the heat-conducting substrate 11.

The differential temperature sensor 5 is mounted in such a manner that its first sensitive element is held in thermal contact with the first working surface of the cooling means 2 (the heat-conducting substrate 9) and the second sensitive element is held in contact with the second working surface of the cooling means 3 (the heat-conducting substrate 16).

The leads of the heater 1 are connected to terminals 17 and 18, the leads of the power supply circuit of the cooling means 2 (electrodes 10) are connected to terminals 19 and 20, the leads of the power supply circuit of the cooling means 3 (electrodes 15) are connected to terminals 21 and 22, the output of the sensor 4 is connected to terminals 23 and 24, and the output of the sensor 5 is connected to terminals 25 and 26.

To resist thermal effect from the environment, the squarer element except the heatsink 6 are housed in an evacuated casing, for example, a glass one (not shown in the figure).

The heater 1 is a resistive element formed on the heat-conducting substrate 9 by a thin-film deposition method.

The differential temperature sensor 4 is implemented in the form of two thermocouples, which connect each other is serial opposition. The differential temperature sensor 5 has identical design features with the sensor 4.

The heatsink 6 is implemented as a copper plate.

The elements 7 and 12 of the cooling means 2 and 3 are made of a semiconductor material comprising alloys $Bi_2Te_3$, $Sb_2Te_3$. The cooling means 2 and 3 are thermocouples whose working surfaces are cooled or heated in accordance with the Peltier effect when a current is passed through them, their cooling or heating depends on the current direction.

The heat-conducting substrates 9, 11, 14 and 16 are made of beryllium oxide.

Figure 2:
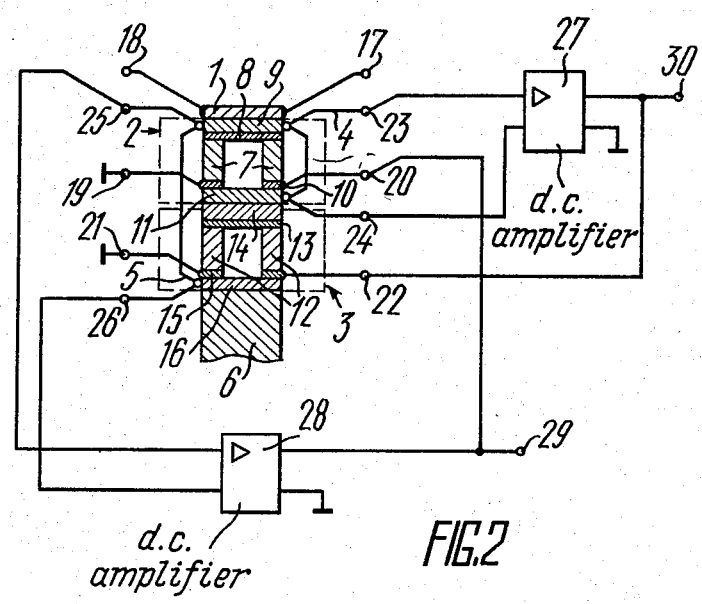
FIG. 2 shows a lateral section of a squarer provided with a trigger circuit built around d.c. amplifiers, according to the invention.

To provide for automation of the squaring operation, the output of the differential temperature sensor 4 (terminals 23 and 24) is connected to the input of a d.c. amplifier 27 (FIG. 2). The output of the d.c. amplifier 27 is connected to the power supply circuit of the cooling means 3 (terminals 21 and 22). The output of the differential temperature sensor 5 (terminals 25 and 26) is connected to the input of a d.c. amplifier 28 having its output connected to the power supply circuit of the cooling means 2 (terminals 19 and 20). Used for the squarer output is the output of the d.c. amplifier 28 (terminal 29)—the power supply circuit of the cooling means 2. The power supply circuit of the cooling means 3 (terminal 30) serves as an additional output of the squarer.

The d.c. amplifiers 27 and 28 utilize conventional d.c. amplification circuits with a differential input stage.

To attain a more accurate squaring operation, the output of the differential temperature sensor 4 (terminals 23 and 24) is connected to the input of a converter 31 (FIG. 3) adapted to convert voltage to pulse length and having its output coupled to the power supply circuit of the cooling means 3 (terminals 21 and 22). The output of the sensor 5 (terminals 25 and 26) is connected to the input of a converter 32 adapted to convert voltage to pulse length and having its output connected to the power supply circuit of the cooling means 2 (terminals 19 and 20). A terminal 33 serves as the squarer output, while a terminal 34 serves as an additional squarer output.

Figure 3:
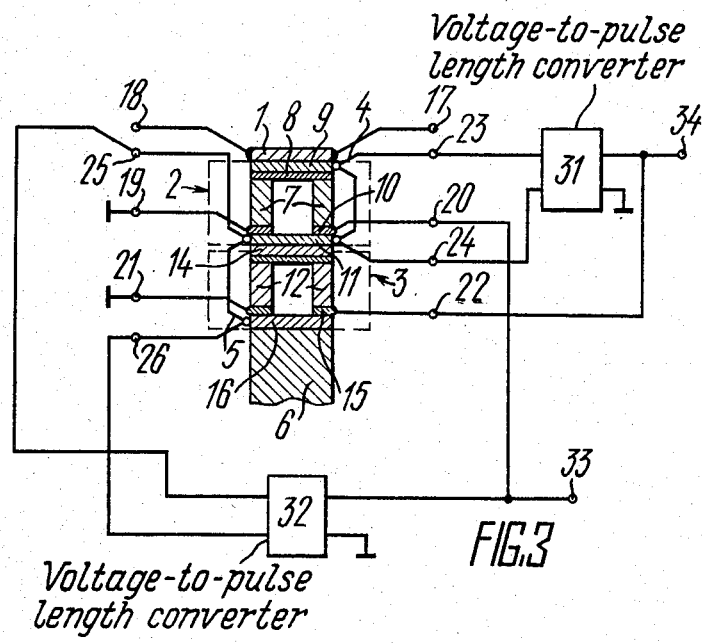
FIG. 3 shows a lateral section of a squarer provided with a trigger circuit, which utilizes voltage-to-pulse length converters, and an additional temperature sensor connected as is described in the second embodiment above, according to the invention.

In the described embodiment of the squarer, the sensitive element of the sensor 5 is held in thermal contact with the second working surface of the cooling means 2 (heat-conducting substrate 11) (see FIG. 3).

The voltage-to-pulse length converters 31 and 32 utilize conventional circuits employed in constructing a converter adapted to convert d.c. voltage to wide-pulse signal.

The squarer of the instant invention operates in the following manner. Input signal $I_1$ is applied to the heater 1 (FIG. 1, terminals 17 and 18) and its temperature is thus raised. The thermal flux from the heater 1 flows through the heat-conducting substrate 9 and the temperature of the latter is raised. Applied to the power supply circuit of the cooling means 3 (terminals 21 and 22) is reference signal $I_2$. Adjusting the value and sign of reference signal $I_2$ provides a condition in which the sensor 4 generates a zero output signal; under these circumstances, the first and second working surfaces of the cooling means 2 as well as the first working surface of the cooling means 3 are held at the same temperature. This means that the temperature of the heat-conducting substrate 9 is equal to the temperature of the heat-conducting substrates 11 and 14.

Reference signal $I_3$ is applied to the power supply circuit of the cooling means 2 (terminals 19 and 20). Adjusting the value and sign of reference signal $I_3$ provides a condition in which the sensor 5 generates a zero output signal; in this condition, the temperature of the first working surface 9 of the cooling means 2 will be equal to the temperature of the second working surface 16 of the cooling means 3. This means that the heat-conducting substrates 9 and 16 have the same temperature.

By adjusting the magnitudes of reference signals $I_2$ and $I_3$, one can obtain continuously a zero signal at the outputs of the sensors 4 and 5. It is seen therefore that under steady-state conditions, the heat-conducting substrates 9, 11, 14, 16 have the same temperature which is equal to the ambient temperature. This is explained by the fact that the heat-conducting substrate 16 is in thermal contact with the heatsink 6, which in turn is maintained in thermal contact with the environment. Under these circumstances, the thermal power evolved at the heater 1 is fully compensated by the thermal power evolved at the cooling means 2 and 3 according to $$I_1^2 R = k_1 I_2 = k_2 I_3 \quad (1)$$

where R is the resistance of the heater 1, and $k_1$, $k_2$ are the coefficients related to the thermoelectric efficiency of the material of which the elements of the cooling means 2 and 3, respectively, are made.

Therefore, it is evident that the dependence of input signal $I_1$ on reference signals $I_2$ and $I_3$ follows a square law.

Used for the output signals of the squarer may be either voltages or currents in the power supply circuits of the cooling means 2 and 3.

The squarer as disclosed with reference to FIG. 2 operates to square electric signals in the following manner. With input signal $I_1$ applied to the heater 1, the temperature of the latter is raised. This results in a change in the output signal of the sensor 4 delivered from the terminals 23, 24 to the input of the d.c. amplifier 27. The output signal of the latter is applied to the power supply circuit of the cooling means 3, namely, to the terminals 21, 22. As a result, the temperature at the heat-conducting substrates 14, 11 and 9 is automatically maintained at the same level, which corresponds to a zero output signal of the sensor 4.

The output signal generated by the sensor 5 is delivered from the terminals 25, 26 to the input of the d.c. amplifier 28 whose output is coupled to the power supply circuit of the cooling means 2 (the terminals 19, 20). Thus, the temperature at the heat-conducting substrates 16 and 9 is maintained at the same level, which corresponds to a zero output signal of the sensor 5. Under steady-state conditions $$I_1^2 R = k_1 I_4 = k_2 I_5 \quad (2)$$

where $I_4$ and $I_5$ are the values of the output current of the d.c. amplifiers 27 and 28, respectively.

In other words, the dependence of the input signal on the output signal of the squarer follows a square law.

The squarer as disclosed with reference to FIG. 3 operates to square its input signals as follows. With input signal $I_1$ applied to the heater 1, the temperature of the latter is raised, with the result that a change takes place in the output signal of the sensor 4 delivered to the input of the voltage-to-pulse length converter 31. The latter generates an output signal in the form of a rectangular pulse of constant frequency and amplitude, which has a length that is directly proportional to the signal at the input of the converter 31. Said output signal is delivered to the power supply circuit of the cooling means 3 (terminals 21, 22), with the result that the output signal of the sensor 4 is automatically maintained at zero.

The output signal of the sensor 5 is applied to the input of the voltage-to-pulse length converter 32. The latter generates an output signal in the form of a rectangular pulse of constant amplitude and frequency, which has a length that is directly proportional to the signal at the output of the sensor 5. The output from the converter 32 is coupled to the power supply circuit of the cooling means 2 (terminals 19, 20), thereby automatically maintaining at zero level the output signal of the sensor 5.

In steady-state conditions, the thermal power evolved at the heater 1 due to the action of the input signal is fully compensated for by the thermal power evolved at the cooling means 2 and 3 according to $$I_1^2 R = k_1 I_6 t f = k_2 I_7 t f \qquad (3)$$

where $I_6$ and $I_7$ are pulse amplitudes at the outputs of the converters 31 and 32, t is the length of the pulses at the outputs of the converters 31 and 32, and f is the frequency of the pulses at the outputs of the converters 31 and 32. Since $I_6$=const. $I_7$=const and f=const, one has $$I_1^2 R = k_3 t = k_4 t \qquad (4)$$

where $k_3 = k_1 I_6 f$ and $k_4 = k_2 I_7 f$

It is seen therefore that the dependence of the squarer input signal on the output signal (the length of the above pulse) follows a square law.

Used for the squarer output signal in this case are the length of the voltage (current) pulses in the power supply circuits of the cooling means 2 and 3 (terminals 33, 34).

As stated above, in the course of the squarer operation, provision is made for continuously maintaining a zero level of the difference between the temperatures of the working surfaces of the cooling means 2 (FIGS. 1–3) and cooling means 3, i.e. the difference between the temperatures at the heat-conducting substrates 9, 11, 14, 16. This creates a condition in which the heat leaks due to the thermal conductivity of the constructional elements of the cooling means 2 are zero. This means that the improvement of the sensitivity of the proposed squarer does not depend on the thermal conductivity of said elements, which may have therefore large dimensions, thereby providing for construction of powerful coolers. As a result, the upper limit of the dynamic range of the squarer input signals can be increased without decreasing the squarer sensitivity. In squaring small input signals, heat leaks might affect the squarer sensitivity on account of the environmental thermal conductivity. To resist the drawback, it is feasible to arrange the squarer elements in an evacuated casing.

In the known squarers, an unbalance between the thermal power evolved at the heater due to the passage through it of the input signal and the thermal power evolved by the cooling means causes the variation of the output signal to follow first a linear law and then, as the squaring time increases, an exponential law. In other words, such squarers may be considered as an integrating element in which losses occur.

In the disclosed squarer, a change in the input signal $I_1$ is responsible for the appearance of a difference, $\Delta P$, between the thermal power evolved by the heater 1 and that evolved by the cooling means 2, $\Delta P = I_1^2 R - k_1 I_2$, which results in a change in the temperature of the heater 1. The rate of change of the temperature is given by $$V = \Delta P / C \qquad (5)$$

where C is the thermal conductivity of the heated constructional elements.

Since the heat-conducting substrates 9, 11 and 14 of the squarer are maintained at the same temperature, then, after elapse of time $t_1$, a change $\Delta T$ in the temperature of the heat-conducting substrates 9, 11 and 14, as related to the temperature of the heat-conducting substrate 16, will be $$\Delta T = \int_0^{t_1} \frac{\Delta P}{C} dt = \frac{\Delta P}{C} t_1 \qquad (6)$$

This change $\Delta T$ causes a variation in the output signal of the sensor 5. Thus, an unbalance between the power evolved by the passage of the input signal through the heater 1 and the power evolved by the cooling means 2 results in a condition in which the output signal of the sensor 5 rises linearly with time. This means that the squarer sensitivity depends on the squaring time and the proposed squarer can be treated as an integrating element operating on the loselessness principle. Under these circumstances, an unbalance between said powers, even if small, causes the appearance of the sensor output signal which linearly increases with time. This allows one to use the squarer of the invention for squaring very small input signals.

Industrial Applicability

The squarer of the invention can be used for squaring d.c. and a.c. signals of arbitrary shape, which are handled by computing and measuring devices operated in conjunction with industrial automatic control systems and radio equipment utilizing radio frequencies. It can also be used in measuring instruments that handle root-mean-square values of noise in radio equipment.

We claim:

1. A squaring device comprising an electrical heater with leads serving as inputs of said squaring device; a first cooling means having first and second working surfaces, said first working surface of said first cooling means being maintained in thermal contact with said heater, and said first cooling means having leads serving as a first output of said squaring device; a second cooling means having first and second working surfaces, said first working surface of said second cooling means being maintained in thermal contact with said second working surface of said first cooling means, and said second cooling means having leads serving as a second output of said squaring device; a first temperature sensor having its first and second sensitive elements maintained in thermal contact with said first and second working surfaces of said first cooling means, respectively; a second temperature sensor having its first and second sensitive elements maintained in thermal contact with said second working surface of said second cooling means and one of said working surfaces of said first cooling means, respectively; and, a heatsink maintained in thermal contact with said second working surface of said second cooling means.

2. A squaring device as claimed in claim 1, further comprising a first D.C. amplifier having an input connected to the sensitive elements of the first temperature sensor and an output coupled to the leads of the second cooling means; and, a second D.C. amplifier having an input connected to the sensitive elements of the second temperature sensor and an output connected to the leads of the first cooling means.

3. A squaring device as claimed in claim 1, further comprising a first converter to convert to voltage to pulse length and having an input connected to the sensitive elements of the first temperature sensor and an output coupled to the leads of the second cooling means; and, a second converter to convert voltage to pulse length and having an input connected to the sensitive elements of the second temperature sensor and an output connected to the leads of the first cooling means.

4. A squaring device as claimed in claim 1, wherein said first and second temperature sensors each comprise differential sensors.

* * * * *